Figure 4:
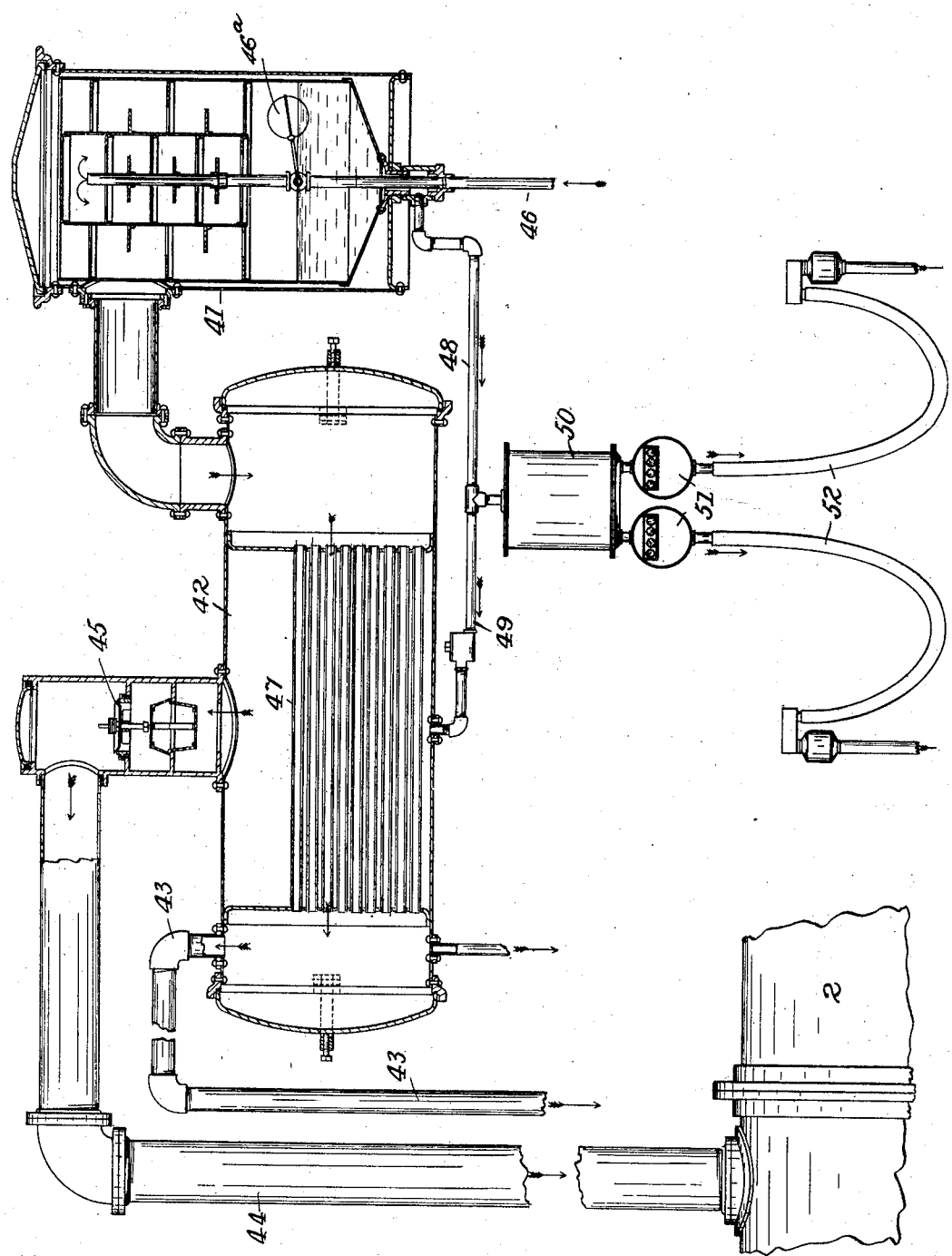

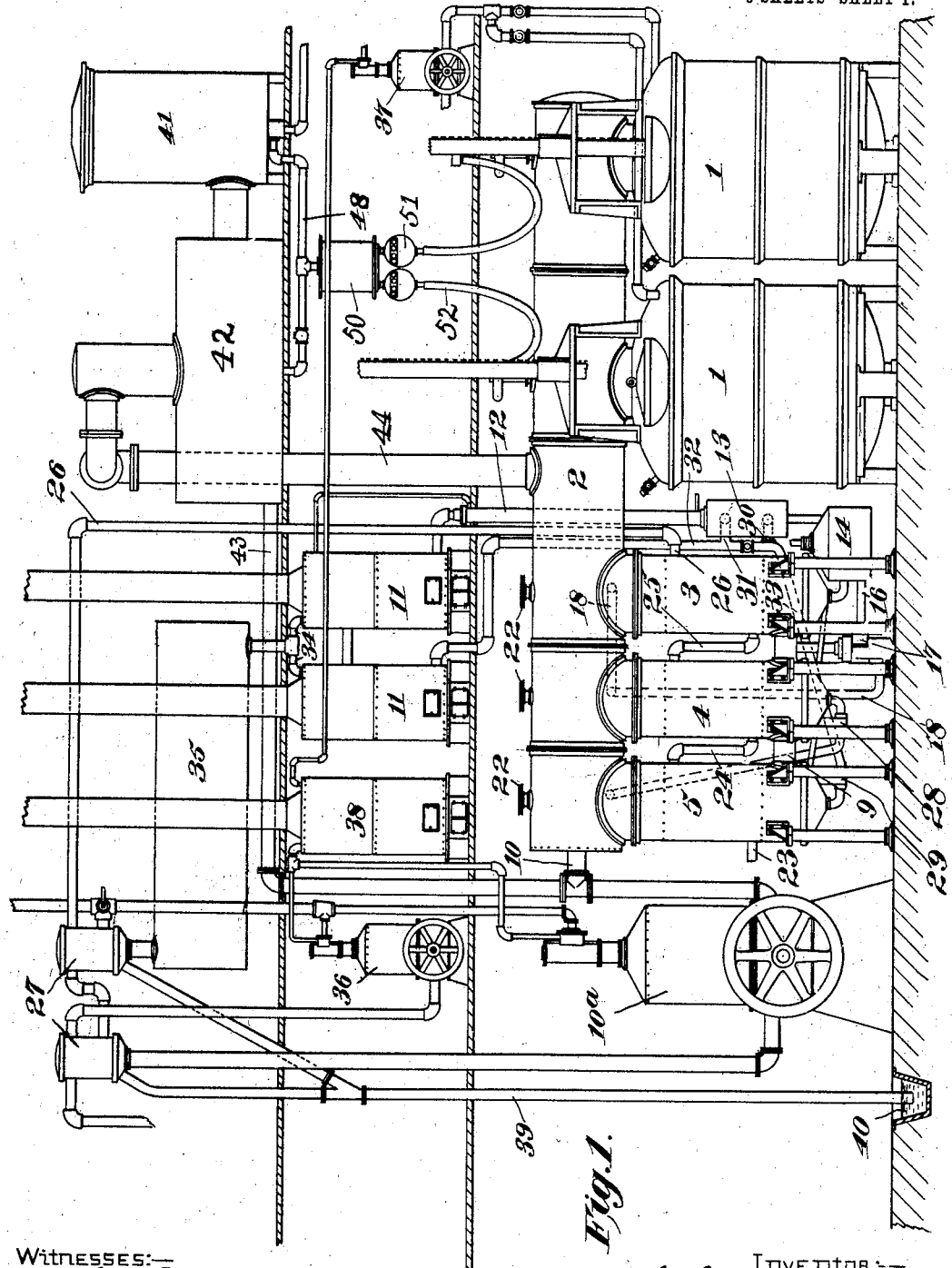

No. 769,110. PATENTED AUG. 30, 1904.
J. PATTEN.
REFRIGERATING APPARATUS.
APPLICATION FILED OCT. 10, 1900.
NO MODEL. 3 SHEETS—SHEET 2.
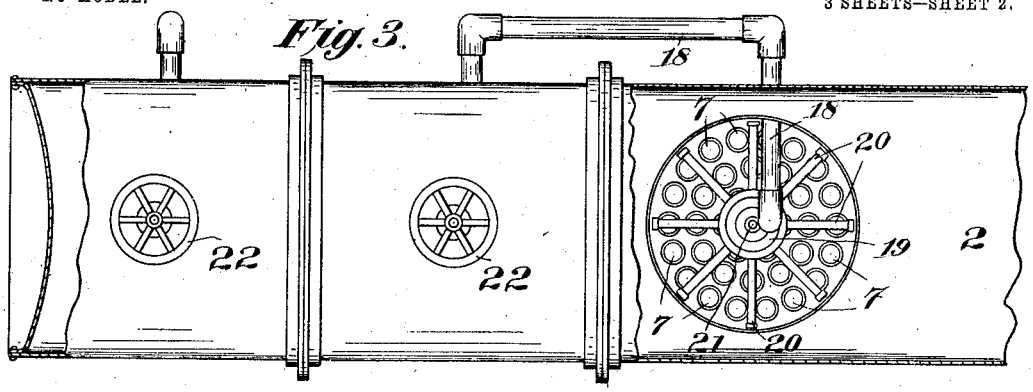
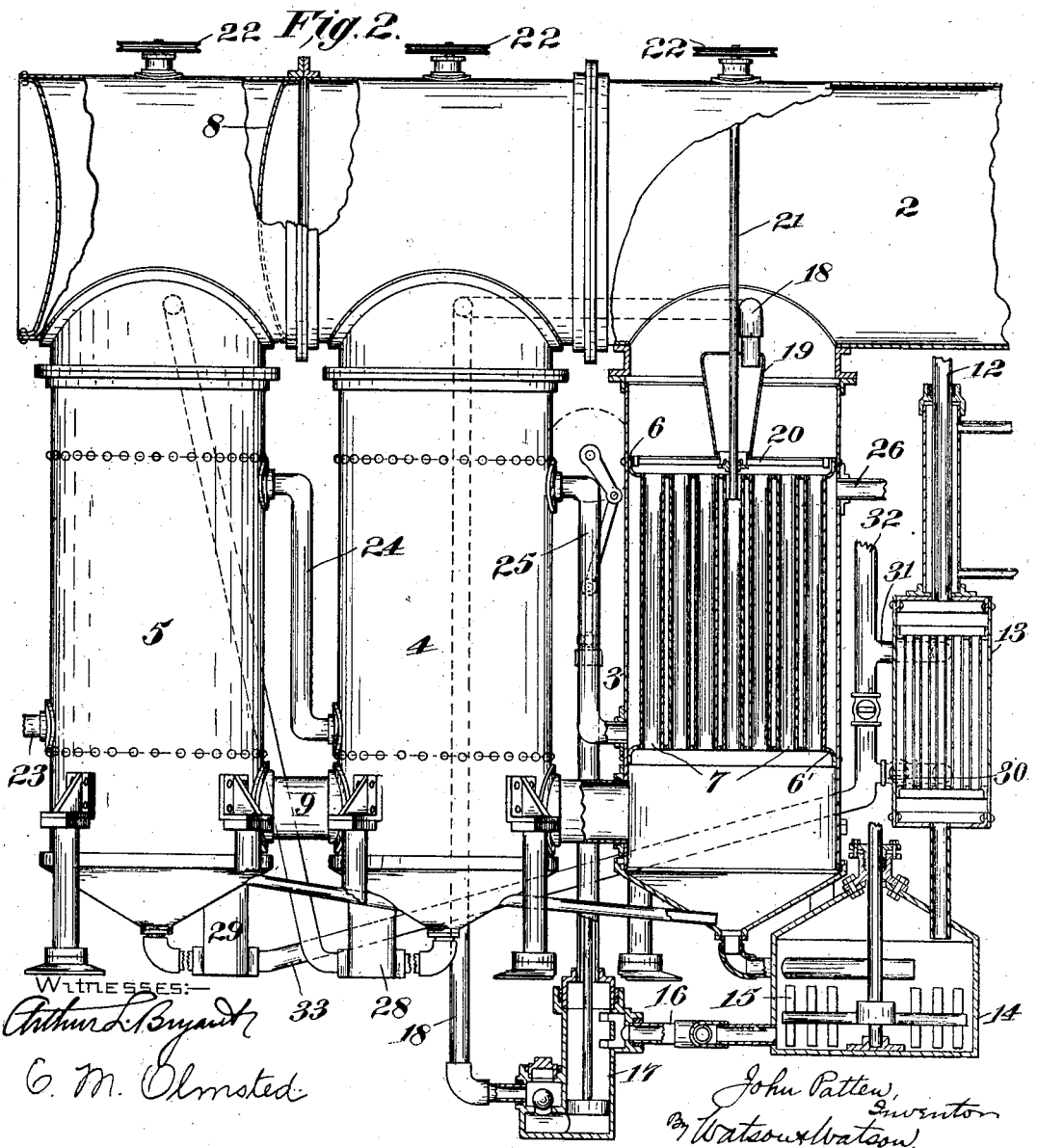

No. 769,110. Patented August 30, 1904

UNITED STATES PATENT OFFICE.

JOHN PATTEN, OF BALTIMORE, MARYLAND, ASSIGNOR TO PATTEN VACUUM ICE MACHINE COMPANY, OF BALTIMORE, MARYLAND, A CORPORATION OF WEST VIRGINIA.

REFRIGERATING APPARATUS.

SPECIFICATION forming part of Letters Patent No. 769,110, dated August 30, 1904.

Application filed October 10, 1900. Serial No. 32,559. (No model.)

*To all whom it may concern:*

Be it known that I, JOHN PATTEN, a citizen of the United States, residing at the city of Baltimore, in the State of Maryland, have invented certain new and useful Improvements in Refrigerating Apparatus, of which the following is a specification.

This invention comprises improvements in that class of refrigerating apparatus in which water is cooled or frozen by subjecting it to the influence of a high vacuum. The rapid evaporation thus produced deprives the water of its heat and converts it if the process be carried far enough into ice. In this class of apparatus a vacuum is created by means of an air or vacuum pump connected with the chamber containing the water to be frozen. The evaporation of the water is so rapid, however, that a high vacuum cannot be maintained without exposing the vapor from the freezing-chamber to the action of a substance which has such an affinity for water that it will absorb a large part of aqueous water *in vacuo*. By the use of such a substance it becomes practicable to maintain a high vacuum continuously in a chamber which is being constantly supplied with water by means of a vacuum-pump or vapor-exhauster of moderate dimensions. The absorbent material must be continuously changed—that is, the dilute material which has performed its work and absorbed a quantity of vapor must be drawn off and replaced by concentrated material. It is customary to provide apparatus for continuously concentrating the absorbent and returning it to the absorber vessels.

I have found that potassium hydroxid (KOH) in solution can be utilized in this class of refrigerating apparatus in place of sulfuric acid, which has heretofore been commonly used, and that this potassium hydroxid has a number of advantages over sulfuric acid. The principal advantage is that the potassium hydroxid does not attack iron, and it can therefore be circulated through iron pipes and vessels and concentrated in an ordinary iron boiler without any protective lining. This substance is introduced into the absorber vessels as a strong solution capable of absorbing a considerable quantity of vapor. The weak solution is pumped off from the absorber to a concentrating-boiler and again returned after concentration to the absorber. It can be concentrated and diluted alternately for an indefinite length of time without deteriorating, and the apparatus for its use is very much cheaper than that required in utilizing sulfuric acid for the same purpose.

The present application embraces refrigerating apparatus especially adapted for the use of potassium hydroxid as an absorbent material.

I shall now proceed to describe the apparatus, reference being had to the accompanying drawings, in which—

Figure 1 is a diagram of a refrigerating plant embodying the present invention, the apparatus being shown in side elevation. Fig. 2 is an enlarged side elevation of the absorbers. Fig. 3 is a plan of the same, Figs. 2 and 3 being partly in section; and Fig. 4 is a view, partly in section, of a portion of the plant in which the water supplied to the freezing-chamber is purified.

Referring to the drawings, 1 designates a freezing-chamber, of which any desired number may be employed, according to the size of the plant, two being shown in Fig. 1. The freezing chamber or chambers communicate with a vapor tube or duct 2, through which vapor is conducted to the absorbers 3, 4, and 5. These absorbers each consist of a cylindrical shell, within which are riveted or otherwise suitably secured transverse head-plates 6 6', to which a series of tubes 7 are united. The heads 6 6' and tubes 7 may be connected together and to the cylindrical shell in the same manner as tubes are fastened in the tube-heads and such heads secured to the cylinders of vertical steam-boilers. The vapor-duct 2 communicates with the first two of the absorbers and is provided with an interior partition 8 between the absorbers 4 5, so that vapor passing through such duct from the freezing-chamber is compelled to enter the absorbers 3 4 and can only reach the other absorber 5 by passing through the first two of the series. The vapor after passing through the first two absorbers is conducted into the third of the series 5 through a connection 9 and after passing upwardly through the tubes 7 therein and the portion of the main vapor-duct 2 beyond the partition 8 passes through a pipe 10 to the vacuum-producing apparatus, which includes an exhaust-pump $10^a$.

The absorbing liquid passes from the concentrators 11 through a pipe 12 and a "heat-exchanger" 13 into a tank or receptacle 14. The concentrators 11 may be of very simple construction, consisting merely of a furnace or heating-chamber and a boiler arranged above said heater. No special arrangement of piping is required in constructing a concentrator for use with such an absorbing liquid as I employ; but the upper portion of the concentrator 11 may be constructed as an ordinary hot-water boiler.

The heat-exchanger 13 consists of a cylindrical shell having a series of vertical tubes arranged therein and supported by transverse heads extending across the shell between its ends. The heated liquid passing downwardly through the pipe 12 passes through these tubes, and the dilute or weakened fluid passing from the absorbers to the concentrators passes around said tubes. The strongly-concentrated potassium hydroxid will solidify if suddenly cooled, and to avoid this I allow it to enter the receptacle or vat 14 while warm and also provide within said vat a stirrer or agitator 15, so that all of the potassium hydroxid will be dissolved in the water with which it is mixed. The absorbing liquid is drawn from said vat 15 through a pipe 16 by means of a pump 17 and from said pump passes through suitable pipes 18 into distributing devices arranged within the absorbers 3 4 above the tubes 7 therein. Each of these distributers consists of a funnel-like member 19, into which the pipe 18 extends and which is provided at its lower end with a series of radial arms 20, having a series of perforations in their lower sides or faces. The distributer is suitably secured to a shaft 21, journaled in bearings in the tube-head 6 of the absorber and the vapor-duct 2, and to the upper end of said shaft is secured a pulley 22, by means of which the distributer can be revolved.

The apertures or openings formed in the arms 20 of the distributing-nozzle or spraying device are arranged at such an angle that the liquid escaping therefrom is sprayed against opposite sides of the inner surface of the tubes 7 as said nozzle is revolved, and the absorbing liquid thus flows down the inner surfaces of said tubes. The tubes 7 are kept cool by water which is circulated through the body of the absorber between the heads 6 6' and about said tubes. In the construction illustrated in the accompanying drawings such cooling water enters the absorber 5 through a pipe 23 and passes from said absorber to the absorber 4 through a pipe 24 and from the absorber 4 to the absorber 3 through a pipe 25, escaping from the last said absorber through an outlet 26, which communicates with the condensers 27 of the vacuum apparatus. It will be understood that the pump 17 simultaneously supplies the funnels 19 of both absorbers 3 4, and by reference to Fig. 2 it will be seen that the partially-diluted absorbing liquid escaping from the tubes 7 in the absorber 3 is conducted into the vat or tank 14 to maintain the solution therein of the proper strength. The absorbing liquid that passes through the tubes 7 of the absorber 4 is by means of a pump 28 forced into the funnel of the rotatable nozzle or spray device in absorber 5. After passing through the tubes of this absorber such liquid is by means of pump 29 delivered to the heat-exchanger 13, entering said exchanger through a pipe 30 and leaving the same through a pipe 31. Said pipes 30 31 are branches of a main pipe 32, that leads from the duct 33, communicating with the pump 29, to the concentrators 11, wherein the liquid is heated and from which the escaping vapor is conducted through pipes 34 and a drum 35 to the condensers 27. The heated and concentrated liquid passes, as before described, back to the heat-exchanger and vat 14 through the pipe 12. Suitable baffle-plates may be arranged within the drum 35 to obstruct the passage of any liquid from the concentrators to the condensers of the vacuum apparatus. An auxiliary exhaust or vacuum-pump 36 is connected with the main exhauster $10^a$ and with the condensers 27, both of said exhausters or pumps, as well as the pump or exhauster 37 for maintaining a vacuum in the freezing-chambers 1, being operated by steam generated in a boiler 38. The water condensed in the condensers 27 is conducted through a pipe 39 into a well 40.

Another advantage attained by the use of a solution of potassium hydroxid as a vapor absorbent is that notwithstanding the great affinity of KOH for water I have found that very little heat is developed by combining the two. When a pound of water-vapor is absorbed by sulfuric acid, I find that about two hundred units of heat are developed over and above what is known as the "latent" heat of vaporization or condensation. When an equal amount of vapor is absorbed by KOH, the additional heat developed is so small that it is scarcely perceptible. When sulfuric acid is used as an absorbent for the entire thousand units of heat for every pound of water-vapor which leaves the freezing-chamber, I find that twelve hundred heat units are developed in the absorber, while when KOH is used only the amount which is carried from the freezing-chambers appears as sensible heat in the absorber. I am thereby enabled to use about twenty per cent. less cooling-water in the absorbers than would be required if sulfuric acid were employed. I also find a like advantage in the concentrators—that is, I find that it requires about twenty per cent. more heat to vaporize a pound of water out of sulfuric acid than is required to vaporize the same amount out of a solution of KOH.

As is well known, potassium hydroxid (KOH) has a strong affinity for carbonic acid ($CO_2$), forming a carbonate when they are chemically united. Therefore in order to provide a successful vacuum refrigerating plant in which potassium hydroxid is employed as the vapor absorbent it is necessary to remove carbonic acid from the water before freezing the same, and I accomplish this in the manner and by the means shown in detail in Fig. 4. Referring particularly to said Fig. 4, the elevated water-supply tank 41 above referred to communicates, through a condenser 42 and pipe 43, with the vacuum-pump $10^a$. By this means a vacuum is maintained in the tank 41, which vacuum is high enough to cause a portion of the water entering said tank to vaporize and cool the remaining body of water almost to the freezing-point. Carbonic acid being more volatile than water passes off with this vaporization. If the vapors were conducted directly to the vacuum-pump, their volume would be so great as to necessitate the employment of an undesirably large pump. Therefore in order to reduce the volume of such vapor it is passed through the condenser 42 from which the carbonic acid and other gases pass on to the vacuum-pump through the pipe 43.

In order to condense the vapor, it is necessary to maintain the conduits or passages through which the vapor passes in the condenser 42 at a low temperature. This I accomplish by surrounding the tubes 47 within said condenser with water which is exposed to the freezing vacuum as the central portion of the condenser above said tubes communicates through a pipe 44 with the main vapor-duct 2. The passage of vapor from the condenser through this duct 44 is retarded and the desired pressure maintained in the condenser 42 by means of a valve 45. The water to be frozen enters the tank 41 through a supply-pipe 46, having therein a valve which is controlled by a float $46^a$, and is broken into a comparatively fine spray by suitable baffle-plates and exposed to the action of the vacuum as above described. The cooled water remaining in the tank 41 passes by a pipe 48 to a filter 50, a portion of such cooled water being conducted through a branch pipe 49 to the central compartment of the condenser 42 about the aforesaid vapor-tubes 47 therein. The float-valve in the tank 41 regulates the supply of water according to the demands and maintains the water around the cooling-tubes 47 at a constant level. When the water is deprived of the carbonic acid, certain metallic salts contained therein are precipitated, which renders it slightly turbid. The particles not in solution are filtered out by a filter 50, and the purified water passes onto the freezing tank or tanks through suitable flexible conductors 52, a meter 51 for indicating the amount of water admitted to each tank being preferably interposed between the filter and flexible pipe. This arrangement of parts I find will eliminate practically all of the carbonic acid from the water and avoid converting the potassium hydroxid into a carbonate of the same. A small percentage of the carbonate of potassium in the water would not be very objectionable, as said carbonate is an absorbent of about the same power as chlorid of calcium. If after the plant has been running for some time under conditions which admit of the formation of small quantities of carbonate of potassium hydroxid and the percentage of such carbonate becomes great enough to deteriorate the absorbing power of the compound, the latter can be diluted with water and treated with calcium hydroxid, which will take up the carbonic acid, forming carbonate of lime and restoring the compound to its original strength.

By reference to Fig. 2 it will be seen that the pipe 12, through which the absorbing compound passes from the concentrators 11, is provided above the heat-exchanger 13 with a steam-jacket 12. This prevents the strong concentrated fluid from solidifying before it reaches the mixing-tank, and in some cases the use of the heat-exchanger can be dispensed with, the liquid passing from the absorber 5 directly through the duct 32 to the concentrator without passing through the intermediate heat-exchanger.

Having described my invention, what I claim as new, and desire to secure by Letters Patent, is—

1. In a vacuum refrigerating apparatus, the combination of a freezing-chamber, an absorber arranged to receive vapor from said freezing-chamber, a rotatable spraying device mounted within said absorber, a concentrator for the absorbing fluid, a vat or tank for receiving the heated liquid from the concentrator, a stirrer within said tank, and a pump for supplying said rotatable spraying device with liquid from said tank, substantially as described.

2. In a vacuum refrigerating apparatus, the combination of a freezing-chamber, an absorber arranged to receive vapor from said freezing-chamber, a rotatable spraying device mounted within said absorber, a concentrator for the absorbing fluid, a vat or tank for receiving the heated liquid from the concentrator, means for supplying a portion of weak solution to said tank, a stirrer within said tank for mixing the concentrated and the weak solutions, and a pump for supplying said rotatable spraying device with liquid from said tank, substantially as described.

3. In a vacuum refrigerating apparatus, the combination of a freezing-chamber, a series of absorbers, a duct for conducting vapor from the freezing-chamber to said absorbers and having an interior partition whereby direct communication between the freezing-chamber and one of said absorbers is prevented, spraying devices arranged within each absorber, a concentrator for the absorbing solution, a tank or vat arranged to receive the absorbing liquid from said concentrator, a pump for forcing the absorbing liquid from said tank to the spraying device of an absorber between the transverse partition in the vapor-duct and the freezing-chamber, the liquid escaping from said absorber being reconducted to said tank or vat, a pump for supplying an absorber on the opposite side of the partition in the vapor-duct from the freezing-chamber with the absorbing liquid and a pump for supplying the concentrator with liquid escaping from the last absorber in the series.

4. In a vacuum refrigerating apparatus, the combination of a freezing-chamber, an absorber, a duct for conducting vapor from said chamber to said absorber, a concentrator for the absorbing fluid, a water-supply pipe, a tank receiving water from the pipe and connected with the freezing-chamber and with an exhaust-pump, a condenser interposed between said water-tank and the exhaust-pump, connections between the condenser and the duct which conducts vapor from the freezing-chamber to the absorber and a pipe for conducting cooled water from said tank to the said condenser.

5. In a vacuum refrigerating apparatus, the combination of exhausting means, a condenser comprising a series of tubes surrounded by water, said water being in communication with the exhausting means whereby it is cooled by evaporation, means for maintaining said water at a constant level, and a water-purifying tank in communication with the exhausting means, the gases and vapor from said purifying-tank being conducted through the said condenser whereby the vapor is liquefied and separated from the gases.

6. In a vacuum refrigerating apparatus, the combination of exhausting means, a condenser comprising a series of tubes surrounded by a water-chamber, a pipe leading from said chamber to the exhausting means, a check-valve in said pipe, means for automatically regulating the supply of water to said chamber, a water-purifying tank, connections from the water-purifying tank to the condenser-tubes, and connections from the condenser-tubes to the exhausting means, the gases and vapor from said purifying-tank being conducted through the said condenser, whereby the vapor is liquefied and separated from the gases.

In testimony whereof I affix my signature in presence of two witnesses.

JOHN PATTEN.

Witnesses:
FELIX R. SULLIVAN,
LOUIS A. KATZENBERGER.